3,084,174
3-ENOL ETHERS OF Δ⁴-STEROIDS
Arthur A. Patchett, Metuchen, and Frances G. Hoffman, Newark, N.J., assignors to Merck & Co., Inc., Rahway, N.J., a corporation of New Jersey
No Drawing. Filed Nov. 17, 1960, Ser. No. 69,840
18 Claims. (Cl. 260—397.4)

This invention is concerned generally with novel steroids and processes of preparing the same. More particularly, it relates to novel 3-enol ethers of 3,20-diketo-4-pregnenes (progesterones) which have an ether group located at the 17-position, which steroids possess useful therapeutic properties as progestational agents. This invention also relates to pharmaceutical compositions containing these novel steroid compounds.

These novel 3-enol ethers, subject of the present invention, may be structurally represented as follows:

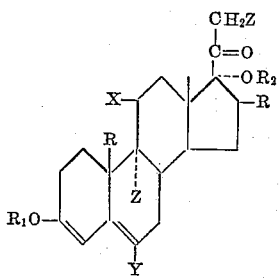

wherein R stands for hydrogen or a methyl group, $R_1$ is an alkyl, cycloalkyl or benzyl radical, $R_2$ stands for an alkyl, allyl or benzyl radical, X is hydrogen, keto or hydroxy, Y stands for hydrogen, methyl, or halogen and Z is hydrogen or halogen.

In preparing our novel chemical compounds, the starting materials utilized are the 17α-ethers of the 4-pregnene-3,20-diones which may be identified by the following formula:

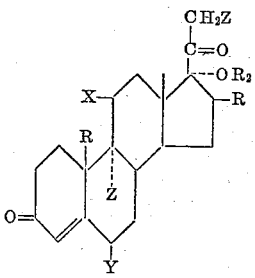

wherein R, $R_2$, X, Y and Z have the significance above defined.

The novel 3-enol ethyl ethers of the 17α-ether-4-pregnene-3,20-diones are prepared by stirring together a mixture of the 3-keto-steroid with ethyl orthoformate in a solvent in the presence of an acid catalyst, such as a strong mineral acid or an organic sulfonic acid. For example, a mixture of the 3-keto-steroid, dioxane, ethyl orthoformate and sulfuric acid are stirred together at 25° C. for approximately 3 hours. The acid is then neutralized with a base such as pyridine. Water is added and the oil separating may be crystallized to give the corresponding 3-enol ether. Alternately, the reaction mixture is extracted with a suitable solvent such as ether, and the extract is dried and evaporated under reduced pressure. The residue is then chromatographed to obtain the corresponding 3-enol ethyl ether.

In a preferred embodiment of my invention, the 3-enol ethyl ethers of the 17α-ether-4-pregnene-11β-ol-3,20-diones which have both a hydroxy group at position 11 and a hydrogen at position 9 (whereby dehydration to the corresponding Δ⁹⁽¹¹⁾-steroid is possible) are prepared by stirring together a mixture of the 3-keto-steroid with absolute ethanol and ethyl orthoformate in the presence of an acid catalyst, such as a strong mineral acid or an organic sulfonic acid. For example, a mixture of the 3-keto-steroid, absolute ethanol, ethyl formate and 2,4-dinitrobenzenesulfonic acid are stirred together at room temperature until solution takes place. The mixture is stirred for a short time longer and then neutralized with an organic base, such as pyridine. The solution is concentrated to about half-volume, water is added, and the concentration is continued until crystallization of the 3-enol ethyl ether results.

The 3-enol methyl and n-propyl ethers of the 17α-ether-4-pregnene-3,20-diones are prepared in the same manner as the 3-enol ethyl ethers, but using methyl orthoformate or n-propyl orthoformate in place of the ethyl orthoformate, and methanol or n-propanol in place of ethanol. A slightly longer reaction time is usually required for the formation of the 3-enol n-propyl ethers.

The novel 3-enol-n-butyl ethers of the 17α-ether-4-pregnene-3,20-diones are prepared by heating a mixture of the 3-keto-steroid with isooctane, n-butanol and an organic sulfonic acid, preferably p-toluenesulfonic acid, in an apparatus equipped with means for removing the water from the distillate, and returning the dry distillate to the reaction mixture. The acid catalyst is then neutralized with a base such as pyridine, and the liquid is evaporated to dryness in vacuo. The residue is purified by crystallization, or by chromatography, to give the corresponding 3-enol n-butyl ether.

The novel 3-enol-n-pentyl, n-heptyl, cyclopentyl and cyclohexyl ethers of the 17α-ether-4-pregnene-3,20-diones are prepared in the same manner as the 3-enol-n-butyl ethers, but using n-pentanol, n-heptanol, cyclopentanol or cyclohexanol, respectively in place of n-amyl alcohol.

The 3-enol benzyl ethers of the 17α-ether-4-pregnene-3,20-diones are prepared by adding the corresponding 3-enol-ethyl ether to an anhydrous mixture of benzene, benzyl alcohol and an organic sulfonic acid such as p-toluenesulfonic acid. The reaction mixture is heated at the boiling point for about 30 minutes with slow continuous co-distillation of benzene and ethanol. The reaction mixture is then cooled to room temperature, made alkaline with pyridine and concentrated to dryness under reduced pressure. The residue is purified by crystallization from methanol containing traces of pyridine, or by chromatography, to give the corresponding 3-enol benzyl-ether.

These novel 3-enol ethers of the 3,20-diketo-4-pregnenes (progesterones) which have an ether group located at the 17α-position have useful therapeutic properties as progestational agents. They have been found to have markedly improved physiological activity, especially as oral progesterones, when compared to the corresponding 3,20-diketo-4-pregnene-17α-ether.

The following examples illustrate methods of carrying out the present invention but it is to be understood that these examples are given for purposes of illustration and not of limitation.

EXAMPLE 1

A mixture of two grams of 17α-methoxy-19-nor-4-pregnene-3,20-dione, 15 ml. of dry dioxane, 2 ml. of ethyl orthoformate and 0.2 ml. of absolute ethanol is treated with 1.4 ml. of 5% sulfuric acid in dioxane. The mixture is stirred at room temperature for one-half hour and then treated with 1–2 ml. of pyridine. Twenty-five ml. of water is slowly added and the resulting oil is scratched and seeded to induce crystallization. The product is filtered and washed with a mixture of 40% dioxane and water, and dried to give 3-ethoxy-17α-methoxy-19-nor-3,5-pregnadiene-20-one.

EXAMPLE 2

A mixture of 100 mg. of 17α-methoxy-4-pregnene-3,20-dione is dissolved in 3 ml. of dry dioxane and combined with 0.5 ml. of freshly distilled ethyl orthoformate, 0.1 ml. absolute ethanol and 0.4 ml. of a solution of 6 drops of sulfuric acid in 5 ml. of dioxane. After stirring at room temperature for 40 minutes, the reaction mixture is diluted with a sodium bicarbonate solution and extracted with ether. The ether extract is dried over magnesium sulfate, and evaporated to dryness in vacuo. The residual oil is chromatographed over 3 g. of alkaline alumina. Elution of the column with petroleum ether-ether 3:2 yields 85 mg. of the desired 3-ethoxy-17α-methoxy-3,5-pregnadiene-20-one, M.P. 150–160° C., I.R. $\lambda_{Nujol}^{max.}$ 5.85, 6.05, 6.15

EXAMPLE 3

A mixture of 5 g. of 17α-methoxy-4-pregnene-3,20-dione, 550 ml. of isooctane (2,2,4-trimethylpentane), 2.5 ml. of n-pentanol and 0.25 g. of p-toluenesulfonic acid is refluxed for 32 hours employing an apparatus (such as that described in Organic Synthesis, collective vol. III (1955), page 382) equipped in such a way that the isooctane falling from the condenser before returning to the flask is separated from the water entrained by it, by means of a suitable trap supplied with an inner funnel containing phosphorous pentoxide mixed with a filter aid such as Celite (a diatomaceous earth). After cooling, 1 ml. of pyridine is added to neutralize the p-toluenesulfonic acid and the liquid is completely evaporated in vacuo to dryness to give a residue of 3-n-pentoxy-17α-methoxy-3,5-pregnadiene-20-one. Purification is effected by recrystallization from methanol containing traces of pyridine or alternately, by chromatography over alumina (alkaline) and elution with ether-petroleum ether mixtures.

In accordance with the above procedure, but using n-heptanol in place of n-pentanol, there is obtained 3-n-heptoxy-17α-methoxy-3,5-pregnadiene-20-one in place of 3-n-pentoxy-17α-methoxy-3,5-pregnadiene-20-one.

EXAMPLE 4

A mixture of 5 g. of 17α-methoxy-4-pregnene-3,20-dione, 550 ml. of isooctane (2,2,4-trimethylpentane), 2.5 ml. of cyclopentanol and 0.25 g. of p-toluenesulfonic acid is refluxed for 32 hours employing an apparatus (such as that described in Organic Synthesis, collective vol. III (1955), page 382) equipped in such a way that the isooctane falling from the condenser before returning to the flask is separated from the water entrained by it, by means of a suitable trap supplied with an inner funnel containing phosphorus pentoxide mixed with a filter aid such as Celite (a diatomaceous earth). After cooling, 1 ml. of pyridine is added to neutralize the p-toluene-sulfonic acid and the liquid is completely evaporated in vacuo to dryness to give a residue of 3-cyclopentoxy-17α-methoxy-3,5-pregnadiene-20-one. Purification is effected by recrystallization from methanol containing traces of pyridine or alternately, by chromatography over alumina (alkaline) and elution with ether-petroleum ether mixtures.

In accordance with the above procedure, but using cyclohexanol in place of cyclopentanol, there is obtained 3-cyclohexoxy-17α-methoxy-3,5-pregnadiene-20-one in place of 3-cyclopentoxy-17α-methoxy-3,5-pregnadiene-20-one.

EXAMPLE 5

A mixture of two grams of 17α-methallyloxy-4-pregnene-3,20-dione, 15 ml. of dry dioxane, 2 ml. of ethyl orthoformate and 0.2 ml. of absolute ethanol is treated with 1.4 ml. of 5% sulfuric acid in dioxane. The mixture is stirred at room temperature for one-half hour and then treated with 1–2 ml. of pyridine. Twenty-five ml. of water is slowly added and the resulting oil is scratched and seeded to induce crystallization. The product is filtered and washed with a mixture of 40% dioxane and water, and dried to give 3-ethoxy-17α-methallyloxy-3,5-pregnadiene-20-one.

EXAMPLE 6

A mixture of two grams of 17α-ethoxy-4-pregnene-3,20-dione, 15 ml. of dry dioxane, 2 ml. of ethyl orthoformate and 0.2 ml. of absolute ethanol is treated with 1.4 ml. of 5% sulfuric acid in dioxane. The mixture is stirred at room temperature for one-half hour and then treated with 1–2 ml. of pyridine. Twenty-five ml. of water is slowly added and the resulting oil is scratched and seeded to induce crystallization. The product is filtered and washed with a mixture of 40% dioxane and water, and dried to give 3,17α-diethoxy-3,5-pregnadiene-20-one.

EXAMPLE 7

A mixture of 5 g. of 17α-n-pentoxy-4-pregnene-3,20-dione, 550 ml. of isooctane (2,2,4-trimethylpentane), 2.5 ml. of n-pentanol and 0.25 g. of p-toluenesulfonic acid is refluxed for 32 hours employing an apparatus (such as that described in Organic Synthesis, collective vol. III (1955), page 382) equipped in such a way that the isooctane falling from the condenser before returning to the flask is separated from the water entrained by it, by means of a suitable trap supplied with an inner funnel containing phosphorus pentoxide mixed with a filter aid such as Celite (a diatomaceous earth). After cooling, 1 ml. of pyridine is added to neutralize the p-toluenesulfonic acid and the liquid is completely evaporated in vacuo to dryness to give a residue of 3,17α-di-n-pentoxy-3,5-pregnadiene-20-one. Purification is effected by recrystallization from methanol containing traces of pyridine or alternately, by chromatography over alumina (alkaline) and elution with ether-petroleum mixtures.

In accordance with the above procedure, but using n-heptanol in place of n-pentanol, there is obtained 3-n-heptoxy-17α-n-pentoxy-3,5-pregnadiene-20-one in place of the 3,17α-di-n-pentoxy-3,5-pregnadiene-20-one.

EXAMPLE 8

A mixture of two grams of 17α-methoxy-6α-methyl-4-pregnene-3,20-dione, 15 ml. dry dioxane, 2 ml. of ethyl orthoformate and 0.2 ml. of absolute ethanol is treated with 1.4 ml. of 5% sulfuric acid in dioxane. The mixture is stirred at room temperature for one-half hour and then treated with 1–2 ml. of pyridine. Twenty-five ml. of water is slowly added and the resulting oil is scratched and seeded to induce crystallization. The product is filtered and washed with a mixture of 40% dioxane and water, and dried to give 3-ethoxy-17α-methoxy-6-methyl-3,5-pregnadiene-20-one.

EXAMPLE 9

A mixture of two grams of 17α-methoxy-6α-fluoro-4-pregnene-3,20-dione, 15 ml. of dry dioxane, 2 ml. of ethyl orthoformate and 0.2 ml. of absolute ethanol is treated with 1.4 ml. of 5% sulfuric acid in dioxane. The mixture is stirred at room temperature for one-half hour and then treated with 1–2 ml. of pyridine. Twenty-five ml. of water is slowly added and the resulting oil is scratched and seeded to induce crystallization. The product is filtered and washed with a mixture of 40% dioxane and water, and dried to give 3-ethoxy-17α-methoxy-6-fluoro-3,5-pregnadiene-20-one.

EXAMPLE 10

A mixture of two grams of 17α-ethoxy-6α-chloro-4-pregnene-3,20-dione, 15 ml. of dry dioxane, 2 ml. of ethyl orthoformate and 0.2 ml. of absolute ethanol is treated with 1.4 ml. of 5% sulfuric acid in dioxane. The mixture is stirred at room temperature for one-half hour and then treated with 1–2 ml. of pyridine. Twenty-five ml. of water is slowly added and the resulting oil is scratched and seeded to induce crystallization. The product is filtered and washed with a mixture of 40% dioxane, and water, and dried to give 3,17α-diethoxy-6-chloro-3,5-pregnadiene-20-one.

EXAMPLE 11

A mixture of two grams of 17α-methoxy-16α-methyl-4-pregnene-3,20-dione, 15 ml. of dry dioxane, 2 ml. of ethyl orthoformate, and 0.2 ml. of absolute ethanol is treated with 1.4 ml. of 5% sulfuric acid in dioxane. The mixture is stirred at room temperature for one-half hour and then treated with 1-2 ml. of pyridine. Twenty-five ml. of water is slowly added and the resulting oil is scratched and seeded to induce crystallization. The product is filtered and washed with a mixture of 40% dioxane and water, and dried to give 3-ethoxy-17α-methoxy-16α-methyl-3,5-pregnadiene-20-one.

EXAMPLE 12

A mixture of two grams of 17α-allyloxy-16α-methyl-4-pregnene-3,20-dione, 15 ml. dry dioxane, 2 ml. of ethyl orthoformate and 0.2 ml. of absolute ethanol is treated with 1.4 ml. of 5% sulfuric acid in dioxane. The mixture is stirred at room temperature for one-half hour and then treated with 1-2 ml. of pyridine. Twenty-five ml. of water is slowly added and the resulting oil is scratched and seeded to induce crystallization. The product is filtered and washed with a mixture of 40% dioxane and water, and dried to give 3-ethoxy-17α-allyloxy-16α-methyl-3,5-pregnadiene-20-one.

EXAMPLE 13

To a mixture of 125 ml. of benzene and 2.1 ml. of benzyl alcohol is added 30 mgm. of p-toluene-sulfonic acid. A small portion of benzene is distilled from the solution to remove traces of moisture. To the remaining solution is added 1 g. of 3-ethoxy-17α-benzyloxy-6,16α-dimethyl-3,5-pregnadiene-20-one. The mixture is then heated at the boiling point for 30 minutes with slow, continuous co-distillation of benzene and ethanol. The reaction mixture is then cooled to room temperature, made alkaline by the addition of a few drops of pyridine, and concentrated to dryness under reduced pressure to give a residue of 3,17α-bis-benzyloxy-6,16α-dimethyl-3,5-pregnadiene-20-one. Purification is effected by recrystallization from methanol containing traces of pyridine. Alternately, the product is purified by chromatography over alumina (alkaline) and elution with ether-petroleum ether mixtures.

EXAMPLE 14

A mixture of two grams of 17α-methoxy-16β-methyl-4-pregnene-3,20-dione, 15 ml. dry dioxane, 2 ml. of ethyl orthoformate and 0.2 ml. of absolute ethanol is treated with 1.4 ml. of 5% sulfuric acid in dioxane. The mixture is stirred at room temperature for one-half hour and then treatetd with 1-2 ml. of pyridine. Twenty-five ml. of water is slowly added and the resulting oil is scratched and seeded to induce crystallization. The product is filtered and washed with a mixture of 40% dioxane and water, and dried to give 3-ethoxy-17α-methoxy-16β-methyl-3,5-pregnadiene-20-one.

EXAMPLE 15

A mixture of two grams of 17α-methoxy-21-fluoro-4-pregnene-3,20-dione, 15 ml. of dry dioxane, 2 ml. of ethyl orthoformate and 0.2 ml. of absolute ethanol is treated with 1.4 ml. of 5% sulfuric acid in dioxane. The mixture is stirred at room temperature for one-half hour and then treated with 1-2 ml. of pyridine. Twenty-five ml. of water is slowly added and the resulting oil is scratched and seeded to induce crystallization. The product is filtered and washed with a mixture of 40% dioxane and water, and dried to give 3-ethoxy-17α-methoxy-21-fluoro-3,5-pregnadiene-20-one.

EXAMPLE 16

A mixture of 5 g. of 17α-n-butoxy-21-fluoro-4-pregnene-3,20-dione, 550 ml. of isooctane (2,2,4-trimethyl-pentane), 2.5 ml. of n-butanol and 0.25 g. of p-toluene-sulfonic acid is refluxed for 32 hours employing an apparatus (such as that described in Organic Synthesis, collective vol. III (1955), page 382) equipped in such a way that the isooctane falling from the condenser before returning to the flask is separated from the water entrained by it, by means of a suitable trap supplied with an inner funnel containing phosphorus pentoxide mixed with a filter aid such as Celite (a diatomaceous earth). After cooling, 1 ml. of pyridine is added to neutralize the p-toluene-sulfonic acid and the liquid is completely evaporated in vacuo to dryness to give a residue of 3,17α-di-n-butoxy-21-fluoro-3,5-pregnadiene-20-one. Purification is effected by recrystallization from methanol containing traces of pyridine or alternately, by chromatography over alumina (alkaline) and elution with ether-petroleum ether mixtures.

EXAMPLE 17

A mixture of two grams of 17α-ethoxy-9α-fluoro-4-pregnene-3,11,20-trione, 15 ml. dry dioxane, 2 ml. of ethyl orthoformate and 0.2 ml. of absolute ethanol is treated with 1.4 ml. of 5% sulfuric acid in dioxane. The mixture is stirred at room temperature for one-half hour and then treated with 1-2 ml. of pyridine. Twenty-five ml. of water is slowly added and the resulting oil is scratched and seeded to induce crystallization. The product is filtered and washed with a mixture of 40% dioxane and water, and dried to give 3,17α-diethoxy-9α-fluoro-3,5-pregnadiene-11,20-dione.

EXAMPLE 18

A mixture of two grams of 17α-methoxy-9α-bromo-4-pregnene-3,11,20-trione, 15 ml. dry dioxane, 2 ml. of ethyl orthoformate and 0.2 ml. of absolute ethanol is treated with 1.4 ml. of 5% sulfuric acid in dioxane. The mixture is stirred at room temperature for one-half hour and then treated with 1-2 ml. of pyridine. Twenty-five ml. of water is slowly added and the resulting oil is scratched and seeded to induce crystallization. The product is filtered and washed with a mixture of 40% dioxane and water, and dried to give 3-ethoxy-17α-methoxy-9α-bromo-3,5-pregnadiene-11,20-dione.

EXAMPLE 19

A mixture of two grams of 17α-n-propoxy-9α-chloro-3-pregnene-3,11,20-triones, 15 ml. dry dioxane, 2 ml. of n-propyl orthoformate and 0.2 ml. of absolute n-propanol is treated with 1.4 ml. of 5% sulfuric acid in dioxane. The mixture is stirred at room temperature for one-half hour and then treated with 1-2 ml. of pyridine. Twenty-five ml. of water is slowly added and the resulting oil is scratched and seeded to induce crystallization. The product is filtered and washed with a mixture of 40% dioxane and water, and dried to give 3,17α-di-n-propoxy-9α-chloro-1,4-pregnadiene-11,20-dione.

EXAMPLE 20

Ten grams of 17α-methoxy-9α-fluoro-4-pregnene-11β-ol-3,20-dione, 100 ml. of absolute ethanol (distilled from calcium hydride), 10 ml. of ethyl orthoformate and 0.300 g. of 2,4-dinitrobenzenesulfonic acid are stirred at room temperature until solution is effected. The reaction mixture is stirred for an additional 15 minutes and 1 ml. of pyridine is added. The solution is concentrated to half-volume and 10 ml. of water is added. Concentration is continued until crystallization occurs. About 100 ml. of water is added and the product is filtered, washed well with water, and dried to give 3-ethoxy-17α-methoxy-9α-fluoro-3,5-pregnadiene-11β-ol-20-one.

EXAMPLE 21

Ten grams of 17α-methoxy-9α-chloro-4-pregnene-11β-ol-3,20-dione, 100 ml. of absolute ethanol (distilled from calcium hydride), 10 ml. of ethyl orthoformate and 0.300 g. of 2,4-dinitrobenzenesulfonic acid are stirred at room temperature until solution is effected. The reaction mixture is stirred for an additional 15 minutes and 1 ml. of pyridine is added. The solution is concentrated to half-volume and 10 ml. of water is added. Concentration is continued until crystallization occurs. About 100 ml. of water is added and the product is filtered, washed well with water, and dried to give 3-ethoxy-17α-methoxy-9α-chloro-3,5-pregnadiene-11β-ol-20-one.

EXAMPLE 22

Ten grams of 17α-methoxy-9α-bromo-4-pregnene-11β-ol-3,20-dione, 100 ml. of absolute ethanol (distilled from calcium hydride), 10 ml. of ethyl orthoformate and 0.300 g. of 2,4-dinitrobenzenesulfonic acid are stirred at room temperature until solution is effected. The reaction mixture is stirred for an additional 15 minutes and 1 ml. of pyridine is added. The solution is concentrated to half-volume and 10 ml. of water is added. Concentration is continued until crystallization occurs. About 100 ml. of water is added and the product is filtered, washed well with water, and dried to give 3-ethoxy-17α-methoxy-9α-bromo-3,5-pregnadiene-11β-ol-20-one.

The 17α-alkoxy-progesterones which are used as starting materials in the above examples are prepared in the following manner:

17α-Methoxy-4-Pregnene-3,20-Dione

A mixture of 100 mg. of 17α-hydroxy-4-pregnene-3,20-dione, 5.0 ml. of methyl iodide and 300 mg. of silver oxide, prepared, for example, by precipitation of a warm aqueous solution of silver nitrate with somewhat less than one mole of an aqueous solution of pure sodium hydroxide, is stirred at the reflux temperature for approximately 7 hours. The entire reaction mixture is filtered to remove the precipitated silver iodide, excess silver oxide and occluded impurities. The solid precipitate is then washed on the filter with chloroform to remove any occluded steroid. The filtrate and washings containing the product are combined and evaporated under reduced pressure to give a solid residue comprising the product. The residue is dissolved in benzene and chromatographed on 5 g. of acid-washed alumina. The eluate from the chromatograph column having a solvent composition of ether:petroleum ether (3:7) to (1:9) contains the desired 17α-methoxy-4-pregnene-3,20-dione. The product is recovered and purified by evaporation of the solvent from the eluate fraction and recrystallization of the residue. The purified 17α-methoxy-4-pregnene-3,20-dione melts at 209–211° C.

$\lambda_{max.}^{MeOH}$ 241 mm., E 16,400. $\lambda_{max.}^{Nujol}$ 5.87, 5.98, 6.20μ

Nuclear magnetic resonance data is consistent with the assigned structure, showing a $CH_3O$ grouping at 130.5 cycles on the high field side of benzene.

In similar manner and using as the steroid starting material 17α-hydroxy-19-nor-4-pregnene-3,20-dione the product obtained after purification is 17α-methoxy-19-nor-4-pregnene-3,20-dione.

17α-Methoxy-4-Pregnene-3,20-Dione

To a mixture of 100 mg. of 17α-hydroxy-4-pregnene-3,20-dione in 2 ml. of N,N′-dimethylformamide and 1 ml. of methyl iodide is added 200 mg. of silver oxide, prepared for example, by precipitation of a warm aqueous solution of silver nitrate with somewhat less than one mole of an aqueous solution of pure sodium hydroxide. The mixture is stirred at room temperature for approximately 16 hours. Approximately 25 ml. of chloroform is added and the resulting precipitate containing silver iodide is filtered off and washed with chloroform. The filtrate and washings are combined and evaporated under reduced pressure to give a residue of crude crystalline product. The product is purified by chromatography and recrystallized from ethanol or methylene chloride/ether to give essentially pure 17α-methoxy-4-pregnene-3,20-dione.

This process can be carried out using benzene as the solvent instead of dimethylformamide and carrying out the reaction at the reflux temperature of the benzene for approximately 7 hours.

In the manner described above and employing in place of methyl iodide an equivalent amount of methallyl iodide, the product obtained by extraction and chromatography is 17α-methallyloxy-4-pregnene-3,20-dione.

In the manner described above and using ethyl iodide in place of methyl iodide, the product obtained after extraction and chromatography is 17α-ethoxy-4-pregnene-3,20-dione.

In the manner described above and using 1-iodo-n-pentane in place of methyl iodide, the product obtained after extraction and chromatography is 17α-amoxy-4-pregnene-3,20-dione.

17α-Methoxy-6α-Methyl-4-Pregnene-3,20-Dione

A mixture is prepared of 150 mg. of 17α-hydroxy-6α-methyl-4-pregnene-3,20-dione, 3 ml. of N,N′-dimethylformamide and 1.5 ml. of methyl iodide and to this is added 300 mg. of siliuver oxide, prepared, for example, by precipitation of a warm aqueous solution of silver nitrate with somewhat less than one mole of an aqueous solution of pure sodium hydroxide. The mixture is stirred at room temperature for approximately 16 hours. About 25 ml. of chloroform is added and the inorganic precipitate is filtered off and washed with chloroform. The filtrate and washings containing the product are combined and evaporated under reduced pressure to give a residue of crude crystalline product. The product is then purified by chromatography on 6 g. of acid-washed alumina. The eluate having a solvent composition of ether:petroleum ether (3:2) contains the major portion of the product. After evaporation of the solvent from the eluate, the product is further purified by recrystallization from methanol to give 17α-methoxy-6α-methyl-4-pregnene-3,20-dione having a melting point of 172–174° C.

6α-Fluoro-17α-Methoxy-4-Pregnene-3,20-Dione

To 100 mg. of 6α-fluoro-17α-hydroxy-4-pregnene-3,20-dione in 5 ml. of methyl iodide and 5 ml. of N,N′-dimethylformamide is added 300 mg. of silver oxide prepared, for example, by precipitation of a warm aqueous solution of silver nitrate with somewhat less than one mole of an aqueous solution of pure sodium hydroxide. The reaction mixture is stirred at 25° C. for about 72 hours. It is then filtered to remove the inorganic precipitate comprising silver iodide and the precipitate is washed with chloroform. The filtrates and washings containing the product are evaporated under reduced pressure to give a crude residue comprising 6α-fluoro-17α-methoxy-4-pregnene-3,20-dione, which is purified by chromatography on acid-washed alumina followed by recrystallization from methylene chloride and ether. The product exhibits absorption in the ultra violet region at 235 mμ and the infra-red spectrum of the purified product shows no hydroxyl band in the 3 μ region.

In similar manner, using as the steroid starting material 6α-chloro-17α-hydroxy-4-pregnene-3,20-dione and ethyl iodide as the halogenated hydrocarbon reactant, the corresponding 6α-chloro-17α-ethoxy-4-pregnene-3,20-dione is obtained.

17α-Methoxy-16α-Methyl-4-Pregnene-3,20-Dione

To 50 mg. of 17α-hydroxy-16α-methyl-4-pregnene-3,20-dione in 3 ml. of methyl iodide and 3 ml. of N,N-dimethylformamide is added 180 mg. of silver oxide prepared, for example, by precipitation of a warm aqueous solution of silver nitrate with somewhat less than one mole of an aqueous solution of pure sodium hydroxide. The mixture is stirred at 25° C. for approximately 72 hours. The formed inorganic precipitate containing silver iodide is filtered off and the precipitate is washed with chloroform. The combined filtrates and washings containing the product are evaporated under reduced pressure to give a crude residue comprising 17α-methoxy-16α-methyl-4-pregnene-3,20-dione. The crude product is purified by chromatography on acid-washed alumina and recrystallized from a solution of methylene chloride and ether.

In similar manner, using 17α-hydroxy-16α-methyl-4-pregnene-3,20-dione as the steroid starting material and allyl iodide as the halogenated hydrocarbon reactant, the product obtained is 17α-allyloxy-16α-methyl-4-pregnene-3,20-dione.

In similar manner and using 17α-hydroxy-6α,16α-dimethyl-4-pregnene-3,20-dione as the steroid starting material and benzyl iodide as the halogenated hydrocarbon reactant, the product obtained after chromatography and recrystallization is 17α-benzyloxy-6α,16α-dimethyl-4-pregnene-3,20-dione.

*17α-Methoxy-16β-Methyl-4-Pregnene-3,20-Dione*

To 50 mg. of 17α-hydroxy-16β-methyl-4-pregnene-3,20-dione in 3 ml. of methyl iodide and 3 ml. of N,N-dimethylformamide is added 180 mg. of silver oxide prepared, for example, by precipitation of a warm aqueous solution of silver nitrate with somewhat less than one mole of an aqueous solution of pure sodium hydroxide. The mixture is stirred at 25° C. for approximately 72 hours. The formed inorganic precipitate containing silver iodide is filtered off and the precipitate is washed with chloroform. The combined filtrates and washings containing the product are evaporated under reduced pressure to give a crude residue comprising 17α-methoxy-16β-methyl-4-pregnene-3,20-dione. The crude product is purified by chromatography on acid-washed alumina and recrystallized from a solution of methylene chloride and ether.

In similar manner, using as the steroid starting material 17α-hydroxy-16β-methyl-4-pregnene-3,20-dione and N-propyl iodide as the halogenated hydrocarbon reactant, the product obtained after recovery and purification is 17-N-propoxy-16β-methyl-4-pregnene-3,20-dione.

*21-Fluoro-17α-Methoxy-4-Pregnene-3,20-Dione*

A mixture is prepared of 100 mg. of 21-fluoro-17α-hydroxy-4-pregnene-3,20-dione, 5 ml. of methyl iodide and 300 mg. of silver oxide prepared, for example, by precipitation of a warm aqueous solution of silver nitrate with somewhat less than one mole of an aqueous solution of pure sodium hydroxide. The mixture is stirred at the reflux temperature for approximately 72 hours. The inorganic precipitate containing silver iodide which formed during the course of the reaction is filtered off and washed with chloroform to recover any occluded product. The filtrate and washings are combined and evaporated under reduced presure to give a crude residue of product comprising 21-fluoro-17α-methoxy-4-pregnene-3,20-dione. The crude residue of product is dissolved in benzene, chromatographed on acid-washed alumina and recrystallized from a mixture of methylene chloride and ether to give essentially pure 21-fluoro-17α-methoxy-4-pregnene-3,20-dione.

In similar manner and using N-butyl iodide as the halogenated hydrocarbon reactant, the product obtained after chromatography and crystallization is 21-fluoro-17α-butoxy-4-pregnene-3,20-dione.

Similarly, using 21-fluoro-17α-hydroxy-16α-methyl-4-pregnene-3,11,20-trione as the steroid starting material and methyl iodide as the halogenated hydrocarbon reactant the product obtained is 21-fluoro-17α-methoxy-16α-methyl-4-pregnene-3,11,20-trione.

*9α-Halogen-17α-Ethoxy-4-Pregnene-3,11,20-Triones*

Approximately 100 mg. of 9α-fluoro-17α-hydroxy-4-pregnene-3,11,20-trione is mixed with 5 ml. of ethyl iodide 5 ml. N,N'-dimethylformamide, 300 mg. of silver oxide prepared, for example, by precipitation of a warm aqueous solution of silver nitrate with somewhat less than one mole of an aqueous solution of pure sodium hydroxide. The reaction mixture is stirred at 25° C. for approximately 72 hours. The inorganic precipitate comprising silver iodide which is formed during the course of the reaction is removed by filtration and the precipitate washed with chloroform to recover any occluded steroid reaction product. The filtrate and washings are combined and evaporated under reduced pressure to give a residue comprising 9α - fluoro - 17α - ethoxy-4-pregnene-3,11,20-trione. The crude product is purified by chromatography on acid-washed alumina and recrystallization from methylene chloride and ether to give substantially a pure product.

The same product is obtained in similar manner by substituting ethyl bromide in place of ethyl iodide in the above reaction.

Similarly, using as the steroid starting material 9α-chloro - 17α - hydroxy-4-pregnene-3,11,20-trione or 9α-bromo-17α-hydroxy-4-pregnene-3,11,20-trione in place of the corresponding 9α-fluoro-17α-hydroxy-4-pregnene-3-11,20-trione, the product obtained after chromatography and crystallization is 9α-chloro-17α-ethoxy-4-pregnene-3,11,20 - trione or 9α - bromo - 17α - ethoxy-4-pregnene-3,11,20-trione respectively.

In similar manner and using as the halogenated hydrocarbon reactant, benzyl iodide, propyl iodide, or methyl iodide, the steroid product obtained after chromatography and recrystallization is the corresponding 9α-halogen-17α-benzyloxy-4-pregnene-3,11,20-trione, the 9α-halogen-17α-propoxy-4-pregnene-3,11,20-trione or the 9α-halogen - 17α - methoxy - 4 - pregnene - 3,11,20 - trione respectively.

*9α-Halogen-17α-Methoxy-11β-Hydroxy-4-Pregnene-3,20-Diones*

A mixture is prepared of 50 mg. of 9α-fluoro-11β, 17α-dihydroxy-4-pregnene-,3,20-dione, 2.5 ml. of methyl iodide and 150 mg. of silver oxide prepared, for example, by precipitation of a warm aqueous solution of silver nitrate with somewhat less than one mole of an aqueous solution of pure sodium hydroxide. The reaction mxtures is stirred at the reflux temperature for approximately 72 hours. The entire mixture is filtered to remove the formed inorganic precipitate comprising silver iodide and the precipitate is washed with chloroform to remove any steroid product. The filtrate and washings containing the product are combined and evaporated under reduced pressure to give a crude residue comprising 9α-fluoro - 17α - methoxy - 11β - hydroxy - 4 - pregnene - 3,20-dione, which is purified by chromatography on acid-washed alumina and recrystallization from a mixture of methylene chloride and ether.

In the manner described above and using 9α-chloro-11β,17α-dihydroxy-4-pregnene-3,20-dione as the steroid starting material, the product obtained after reaction with methyl iodide and silver oxide is 9α-chloro-17α-methoxy-11β-hydroxy-4-pregnene-3,20-dione.

*9α-Bromo-17α-Methoxy-11β-Hydroxy-4-Pregnene-3,20-Dione*

In the manner described above and using as the starting material 9α-bromo-11β,17α-dihydroxy-4 - pregnene - 3,20-dione and reacting it with methyl iodide and silver oxide, the product obtained after purification and crystallization is 9α-bromo-17α-methoxy-11β-hydroxy-4-pregnene - 3,20-dione. Using more strenuous reaction conditions, one of the reaction products which may be formed is 9,11-oxido-17α-methoxy-4-pregnene-3,20-dione which is converted to 9α-bromo-17α-methoxy-11β-hydroxy-4 - pregnene - 3,20-dione by treatment with hydrogen bromide.

The 17α-hydroxyprogesterones which are used to prepare the 17α-ethers are obtained in the following manner:

*6α-Methyl-17α-Hydroxyprogesterone*

To 5 g. of 17α-hydroxy-4-pregnene-3,20-dione in 200 ml. of benzene is added 5 ml. of ethylene glycol and 100 mg. of p-toluenesulfonic acid. This mixture is refluxed under a water separator for 24 hours. An additional 5 ml. of ethylene glycol and 100 mg. of p-toluenesulfonic acid is then added and the refluxing continued for 24 hours more. The benzene is cooled and ether added. The combined solvents containing 3,20-bis-ethylenedioxy-5-pregnene-17α-ol are washed with aqueous sodium bicarbonate, dried and concentrated in vacuo to an oil. When this oil is triturated with ether, crystalline product melting at 190° C. is obtained.

2.4 g. of 3,20-bis-ethylenedioxy-5-pregnene-17α-ol is dissolved in 35 ml. of 0.3 molar perbenzoic acid in benzene. After standing two days at room temperature, the solution is cooled to 10° C. and a 15% solution of sodium bisulfite is added until a negative potassium iodide test is obtained. The benzene solution is then washed with sodium bicarbonate, dried and concentrated in vacuo to 2 g. of mixed oxides. The mixed oxides are dissolved in benzene and chromatographed on acid-washed alumina. Elution of the column with a mixture of etherchloroform (1:1) yielded 603 mg. of the 5,6α-oxido-3,20-bis-ethylenedioxy-pregnane-17α-ol, melting point 208–213° C.

$$\lambda_{max.}^{Nujol} \; 2.7\mu, \; 9.1\mu$$

To a solution of 400 mg. of 5,6α-oxido-3,20-bis-ethylenedioxy-pregnane-17α-ol in 96 ml. of dry benzene under nitrogen is added 3.76 ml. of 3-molar methyl magnesium bromide in ether. The mixture is heated at 70° C. under nitrogen for 4 hours. After cooling to 5° C., 9 g. of ammonium chloride in 90 ml. of water is added over a 20-minute period. The benzene is separated and the aqueous layer extracted with benzene. The combined benzene is washed neutral with water, dried and evaporated to dryness in vacuo to yield 346 mg. of oil comprising 3,20-bis-ethylenedioxy-6β-methyl - pregnane - 5α,17α - diol, which, upon trituration with ether, forms crystals of product, M.P. 174–177° C.

A solution of 346 mg. of 3,20-bis-ethylenedioxy-6β-methyl-pregnane-5α,17α-diol is dissolved in 18 ml. of methanol and purged with nitrogen. 1.92 ml. of 8% sulfuric acid (v./v.) is added and then heated at reflux under nitrogen for 35 minutes. The reaction mixture is then cooled to 5° C. and a solution of 1.92 g. of sodium bicarbonate in 40 ml. of water is added with stirring. The gummy precipitate is extracted with chloroform and methylene chloride and the organic extract washed with water, dried and concentrated in vacuo to yield 311 mg. of crystalline 5α,17α-dihydroxy-6β-methyl-pregnane-3,20 - dione, melting point 250–258° C.

$$\lambda_{max.}^{Nujol} \; 5.85, \; 5.95, \; 9.1\mu$$

To a solution of 311 mg. of 5α,17α-dihydroxy-6β-methyl-pregnane-3,20-dione in 15 ml. of methanol is added in a nitrogen atmosphere 0.47 ml. of 5% potassium hydroxide. The reaction mixture is refluxed under nitrogen for one hour. It is then cooled to 5° C. and acidified with a few drops of glacial acetic acid. Ten ml. of water is added and the methanol is removed by concentration in vacuo. The reaction mixture is then extracted with methylene chloride, washed with water, dried and evaporated to give 17α-hydroxy-6α-methyl-4-pregnene-3,20-dione, M.P. 200–210° C.

$$\lambda_{max.}^{Nujol} \; 2.8, \; 5.90, \; 6.01, \; 6.25\mu$$

*16-Methyl-17α-Hydroxyprogesterones*

To a solution of 85 mg. of 17α,21-dihydroxy-16α-methyl-4-pregnene-3,20-dione in 0.5 ml. of pyridine, cooled to 0° C., is added 0.03 ml. of methanesulfonyl chloride. The resulting mixture is allowed to stand at a temperature of approximately 0° C. for a period of approximately 1 hour. Water is then added to the reaction mixture and the crystalline precipitate which forms is recovered, washed with water, and dried to give 21-methane-sulfonyloxy-17α-hydroxy-16α - methyl - 4 - pregnene-3,20-dione.

To 180 mg. of 21-methanesulfonyloxy-17α-hydroxy-16α-methyl-4-pregnene-3,20-dione is dissolved in 10 ml. of acetonee is added 300 mg. of sodium iodide. The resulting mixture is heated at reflux temperature for a period of approximately 1 hour, and the reaction solution is cooled to room temperature and diluted with water. The crystalline material which precipitates is recovered, washed with water, and dried to give 21-iodo-17α-hydroxy-16α-methyl-4-pregnene-3,20-dione.

This 21-iodo-17α-hydroxy - 16α - methyl - 4 - pregnene-3,20-dione is dissolved in a mixture of 5 ml. of water and 5 ml. of ethanol. To the resulting suspension is added 500 mg. of sodium bisulfite and the mixtures heated under reflux for a period of about 1 hour. The reaction solution is cooled, diluted with water, and the crystalline material which separates is recovered, washed with water, dried and recrystallized from ethyl acetate to give 17α-hydroxy-16α-methyl-4-pregnene-3,20-dione.

In similar manner 17α,21-dihydroxy-16β-methyl-4-pregnene-3,20-dione is treated with methanesulfonyl-chloride to produce the corresponding 21-methanesulfonate which is then treated with sodium iodide to produce the corresponding 21-iodo-compound. The 21-iodo compound is then heated with aqueous sodium bisulfite solution to give 17α-hydroxy-16β-methyl-4-pregnene-3,20-dione.

*6α-16α-Dimethyl-17α-Hydroxy-Progesterone*

To a solution of 85 ml. of 17α,21-dihydroxy-6α,16α-dimethoxy-4-pregnene-3,20-dione in 5 ml. of pyridine cooled to 0° C., is added 0.03 ml. of methane sulfonyl chloride. The resulting mixture is allowed to stand at a temperature of approximately 0° C. for a period of approximately one hour. Water is then added to the reaction mixture and the crystalline precipitate which forms is recovered, washed with water, and dried to give 21-methane-sulfonyloxy-17α-hydroxy-6α,16α - dimethyl-4-pregnene-3,20-dione.

To 180 ml. of 21-methanesulfonyloxy-17α-hydroxy-6α,16α-dimethyl-4-pregnene-3,20-dione dissolved in 10 ml. of acetone is added 300 mg. of sodium iodide. The resulting mixture is heated at reflux temperature for a period of approximately one hour, and the reaction solution is cooled to room temperature and diluted with water. The crystalline material which precipitates is recovered, washed with water and dried to give 21-iodo-17α-hydroxy-6α,16α-dimethyl-4-pregnene-3,20-dione.

This 21-iodo-17α-hydroxy-6α,16α-dimethyl-4-pregnene-3,20-dione is dissolved in a mixture of 5 ml. of water and 5 ml. of ethanol. To the resulting suspension is added 500 mg. of sodium bisulfite and the mixture is heated under reflux for a period of about one hour. The reaction solution is cooled, diluted with water, dried and recrystallized from ethyl acetate to give 17α-hydroxy-6α,16α-dimethyl-4-pregnene-3,20-dione.

*21-Fluoro-17α-Hydroxy-Progesterone*

To a solution of 85 ml. of 17α,21-dihydroxy-4- pregnene-3,20-dione in 0.5 ml. of pyridine cooled to 0° C. 0.03 ml. of methanesulfonyl chloride is added. The resulting mixture is allowed to stand at a temperature of approximately 0° C. for a period of approximately one hour. Water is then added to the reaction mixture and the crystalline precipitate which forms is recovered, washed with water, and dried to give 21-methanesulfonyloxy-17α-hydroxy-4-pregnene-3,20-dione.

To a solution of 62 mg. of 21-methanesulfonyloxy-17α-hydroxy-4-pregnene-3,20-dione in 1 ml. of anhydrous dimethylformamide is added sufficient anhydrous potassium fluoride to give a saturated solution. The mixture is heated at a temperature of about 110° C. for approximately 20 hours. The reaction mixture is cooled, water is added thereto, and the aqueous mixture is extracted with chloroform. The chloroform extract is dried, evaporated to dryness and the residual material chromatographed on acid-washed alumina. The alumina column is eluted first with a 1:1 mixture of ether chloroform and then with chloroform. The chloroform eluate is evaporated and the residual material is recrystallized to give 21-fluoro-17α-hydroxy-4-pregnene-3,20-dione.

*9α-Halogen-17α-Hydroxy-4-Pregnene-3,11,20-Trione*

To a solution of 85 mg. of 9α-fluoro-17α,21-dihydroxy-4-pregnene-3,11,20-trione in 0.5 ml. of pyridine, cooled to 0° C., is added 0.03 ml. of methanesulfonyl chloride. The resulting mixture is allowed to stand at a temperature of approximately 0° C. for a period of approximately one hour. Water is then added to the reaction mixture and the crystalline precipitate which forms is recovered, washed with water, and dried to give 9α-fluoro-21-methanesulfonyloxy-17α-hydroxy-4-pregnene-3,11,20-trione.

To 180 mg. of 9α-fluoro-21-methanesulfonyloxy-17α-hydroxy-4-pregnene-3,11,20-trione dissolved in 10 ml. of acetone is added 300 mg. of sodium iodide. The resulting mixture is heated to reflux temperature for a period of approximately one hour, and the reaction solution is cooled to room temperature and diluted with water. The crystalline material which precipitates is recovered, washed with water, and dried to give 9α-fluoro-21-iodo-17α-hydroxy-4-pregnene-3,11,20-trione.

This 9α-fluoro-21-iodo-17α-hydroxy-4-pregnene-3,11,20-trione is dissolved in a mixture of 5 ml. of water and 5 ml. of ethanol. To the resulting suspension is added 500 mg. of sodium bisulfite and the mixture is heated to reflux for a period of about one hour. The reaction solution is cooled, diluted with water and the crystalline material which separates is recovered, washed with water, dried and recrystallized from ethyl acetate to give 9α-fluoro-17α-hydroxy-4-pregnene-3,11,20-trione.

In similar manner the 9α-chloro-, or the 9α-bromo-17α,21-dihydroxy-4-pregnene-3,11,20-trione is treated with methanesulfonyl chloride to produce the 21-methanesulfonate, which is then treated with sodium iodide to produce the corresponding 21-iodo-compound. The 21-iodo compound is then heated with aqueous sodium bisulfite solution to give the 9α-chloro-, or the 9α-bromo-17α-hydroxy-4-pregnene-3,11,20-trione, respectively.

*9α-Halogen-11β,17α-Dihydroxy-4-Pregnene-3,20-Dione*

To a solution of 85 ml. of 9α-fluoro-11β,17α,21-trihydroxy-4-pregnene-3,20-dione in 0.5 ml. of pyridine cooled to 0° C. is added 0.03 ml. of methanesulfonyl chloride. The resulting mixture is allowed to stand at a temperature of approximately 0° C. for a period of approximately one hour. Water is then added to the reaction mixture and the crystalline precipitate which forms is recovered, washed with water, and dried to give 9α-fluoro-21-methanesulfonyloxy-11β,17α-dihydroxy-4-pregnene-3,20-dione.

To 180 mg. of 9α-fluoro-21-methanesulfonyloxy-11β,17α-dihydroxy-4-pregnene-3,20-dione dissolved in 10 ml. of acetone is added 300 mg. of sodium iodide. The resulting mixture is heated at reflux for a period of approximately one hour, and the reaction solution is cooled to room temperature and diluted with water. The crystalline material which precipitates is recovered, washed with water, and dried to give 9α-fluoro-21-iodo-11β,17α-dihydroxy-4-pregnene-3,20-dione.

This 9α-fluoro-21-iodo-11β,17α-dihydroxy-4-pregnene-3,20-dione is dissolved in a mixture of 5 ml. of water and 5 ml. of ethanol. To the resulting suspension is added 500 mg. of sodium bisulfite and the mixture is heated to reflux for a period of about one hour. The reaction solution is cooled, diluted with water and the crystalline material which separates is recovered, washed with water, dried and recrystallized from ethyl acetate to give 9α-fluoro-11β,17α-dihydroxy-4-pregnene-3,20-dione.

In a similar manner, the 9α-bromo-, or the 9α-chloro-11β,17α,21-trihydroxy-4-pregnene-3,20-dione is treated with methanesulfonyl chloride to produce the corresponding 21-methanesulfonate, which is then treated with sodium iodide to produce the corresponding 21-iodo compound. The 21-iodo compound is then heated with aqueous sodium bisulfite solution to give 9α-bromo-, or the 9α-chloro-11β,17α-dihydroxy-4-pregnene-3,20-dione, respectively.

Various changes and modifications may be made in carrying out the present invention without departing from the spirit and scope thereof. Insofar as these changes and modifications are within the purview of the annexed claims, they are to be considered as part of our invention.

We claim:

1. The process which comprises reacting a compound having the following structure:

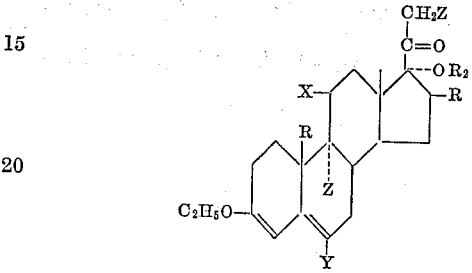

wherein R is a member of the group consisting of hydrogen and a methyl radical, $R_2$ is a member of the group consisting of lower alkyl, allyl and benzyl radicals, X is a member selected from the group consisting of hydrogen, keto and β-hydroxy, Y is a member selected from the group consisting of hydrogen, methyl, chlorine and fluorine and Z is a member of the group consisting of hydrogen and fluorine, with an anhydrous mixture of benzene, benzyl alcohol and an organic sulfonic acid, wherein the ethanol formed during the reaction is continuously removed by co-distillation with benzene, to form a compound of the formula:

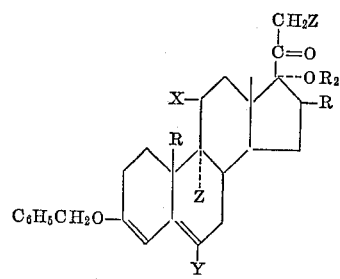

wherein R, $R_2$, X, Y and Z have the significance above defined.

2. A compound of the formula:

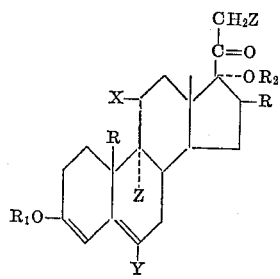

wherein R is a member of the group consisting of hydrogen and a methyl radical, $R_1$ is a member of the group consisting of lower alkyl, cycloalkyl and benzyl radicals, $R_2$ is a member of the group consisting of lower alkyl, allyl and benzyl radicals, X is a member of the group consisting of hydrogen, keto and β-hydroxy, Y is a member selected from the group consisting of hydrogen, methyl, chlorine and fluorine, and Z is a member of the group consisting of hydrogen and fluorine.

3. 3-lower alkoxy-17α-lower alkoxy-19-nor-3,5-pregnadiene-20-one compounds.

4. 3 - lower alkoxy-17α-lower alkoxy-3,5-pregnadiene-20-one compounds.

5. 3-cycloalkoxy-17α-lower alkoxy-3,5-pregnadiene-20-one compounds.

6. 3 - benzyloxy-17α-lower alkoxy-3,5-pregnadiene-20-one compounds.

7. 3 - ethoxy-17α-methoxy-19-nor-3,5-pregnadiene-20-one.

8. 3-ethoxy-17α-methoxy-3,5-pregnadiene-20-one.

9. 3-cyclopentoxy-17α-methoxy - 3,5 - pregnadiene-20-one.

10. 3-cyclohexoxy-17α-methoxy - 3,5 - pregnadiene-20-one.

11. 3 - ethoxy-17α-methoxy-6-methyl-3,5-pregnadiene-20-one.

12. 3-ethoxy-17α-methoxy - 6 - fluoro-3,5-pregnadiene-20-one 13. 3,17α-diethoxy-6-chloro-3,5-pregnadiene-20-one.

14. 3 - ethoxy-17α-methoxy - 16α - methyl-3,5-pregnadiene-20-one.

15. 3 - ethoxy-17α-methoxy - 16β - methyl-3,5-pregnadiene-20-one.

16. 3 - ethoxy-17α-methoxy-21-fluoro-3,5-pregnadiene-20-one.

17. 3 - ethoxy-17α-methoxy - 9α - bromo-3,5-pregnadiene-11β-ol-20-one.

18. 3 - cyclopentoxy-17α-methoxy-6-chloro-3,5-pregnadiene-20-one.

References Cited in the file of this patent
Loewenthal: Tetrahedron, vol. 6, No. 4, p. 291 (June 1959).